(12) United States Patent
Robison et al.

(10) Patent No.: US 11,909,882 B2
(45) Date of Patent: Feb. 20, 2024

(54) SYSTEMS AND METHODS TO CRYPTOGRAPHICALLY VERIFY AN IDENTITY OF AN INFORMATION HANDLING SYSTEM

(71) Applicant: DELL PRODUCTS L.P., Round Rock, TX (US)

(72) Inventors: Charles D. Robison, Buford, GA (US); Nicholas D. Grobelny, Austin, TX (US); Amy C. Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 328 days.

(21) Appl. No.: 16/777,415

(22) Filed: Jan. 30, 2020

(65) Prior Publication Data

US 2021/0243030 A1    Aug. 5, 2021

(51) Int. Cl.
*H04L 9/32* (2006.01)
*H04L 9/08* (2006.01)
*H04L 9/40* (2022.01)

(52) U.S. Cl.
CPC .......... *H04L 9/3234* (2013.01); *H04L 9/0897* (2013.01); *H04L 9/3263* (2013.01); *H04L 63/0442* (2013.01)

(58) Field of Classification Search
CPC ... H04L 9/3234; H04L 9/0897; H04L 9/3263; H04L 63/0442
USPC .......................................................... 713/156
See application file for complete search history.

(56) References Cited

U.S. PATENT DOCUMENTS

| | | | |
|---|---|---|---|
| 7,424,610 B2 | 9/2008 | Ranganathan | |
| 10,602,353 B1* | 3/2020 | Berdy | ..................... G06F 21/57 |
| 2005/0144440 A1* | 6/2005 | Catherman | ........... H04L 9/3236 |
| | | | 713/156 |

(Continued)

FOREIGN PATENT DOCUMENTS

| | | | | |
|---|---|---|---|---|
| CA | 3004189 C | * | 12/2020 | ............. G06F 21/57 |
| CN | 102685092 A | * | 9/2012 | |

(Continued)

OTHER PUBLICATIONS

Jianhong et al., "Protocol for Dynamic Component-Property Attestation in Trusted Computing", IEEE, doi: 10.1109/NSWCTC.2010. 220, 2010, pp. 369-372. (Year: 2010).*

(Continued)

*Primary Examiner* — Peter C Shaw
(74) *Attorney, Agent, or Firm* — Egan, Enders & Huston, LLP.

(57) ABSTRACT

Various embodiments of systems and methods are provided to bind a system identifier that uniquely identifies an information handling system (IHS) to the system platform, so that the identity of the IHS can be cryptographically verified. More specifically, the present disclosure provides methods to bind a unique system identifier to an IHS platform, and methods to cryptographically verify the identity of the IHS using the unique system identifier and a plurality of keys generated and stored with a Trusted Platform Module (TPM) of the IHS. Systems are provided herein to perform such methods. As such, the systems and methods disclosed herein enable system identity to be irrefutably verified, thereby preventing theft and misuse of system identity.

14 Claims, 8 Drawing Sheets

(56) References Cited

U.S. PATENT DOCUMENTS

| | | | | |
|---|---|---|---|---|
| 2005/0149733 | A1* | 7/2005 | Catherman | G06F 21/602 713/175 |
| 2006/0256107 | A1* | 11/2006 | Scarlata | G06F 21/53 345/418 |
| 2008/0319779 | A1* | 12/2008 | Hughes | G06Q 99/00 705/310 |
| 2010/0083354 | A1* | 4/2010 | Tsirtsis | H04L 63/0807 726/5 |
| 2010/0235648 | A1 | 9/2010 | Hoang et al. | |
| 2010/0241836 | A1 | 9/2010 | Proudler | |
| 2013/0014246 | A1* | 1/2013 | Larson | H04L 47/805 726/15 |
| 2013/0054960 | A1* | 2/2013 | Grab | H04L 63/0428 726/17 |
| 2013/0326224 | A1* | 12/2013 | Yavuz | H04L 9/3247 713/176 |
| 2014/0365763 | A1* | 12/2014 | Manohar | G06F 21/53 713/156 |
| 2017/0041147 | A1* | 2/2017 | Krahn | H04L 9/0877 |
| 2017/0237560 | A1 | 8/2017 | Mueller et al. | |
| 2017/0302459 | A1* | 10/2017 | Fenner | H04L 9/3234 |
| 2020/0097661 | A1* | 3/2020 | Block | H04L 9/3271 |

FOREIGN PATENT DOCUMENTS

| | | | | |
|---|---|---|---|---|
| CN | 111371726 | A | * 7/2020 | |
| JP | 2015111440 | A | * 6/2015 | G06F 21/32 |
| TW | 202105208 | A | * 7/2019 | H04L 9/32 |
| WO | WO-2011139135 | A1 | * 11/2011 | H04L 9/321 |
| WO | WO-2013081441 | A1 | * 6/2013 | H04L 63/0823 |
| WO | WO-2022046074 | A1 | * 3/2022 | G06F 21/44 |

OTHER PUBLICATIONS

Liang et al., "The remote attestation design based on the identity and attribute certificates", IEEE, doi: 10.1109/ICCWAMTIP.2014. 7073419, 2014, pp. 325-330. (Year: 2014).*

Wentao et al., "Trusted remote attestation scheme based on property", IEEE, doi: 10.1109/ICCASM.2010.5619358, 2010, pp. V5-52-V5-57. (Year: 2010).*

Fongen et al., "The Integration of Trusted Platform Modules into a Tactical Identity Management System," MILCOM 2013—2013 IEEE Military Communications Conference, 2013, pp. 1808-1813, doi: 10.1109/MILCOM.2013.305. (Year: 2013).*

Wentao et al., "Trusted remote attestation scheme based on property," 2010 International Conference on Computer Application and System Modeling (ICCASM 2010), 2010, pp. V5-52-V5-57, doi: 10.1109/ICCASM.2010.5619358. (Year: 2010).*

Liang et al., "The remote attestation design based on the identity and attribute certificates," Chengdu, China, 2014, pp. 325-330, doi: 10.1109/ICCWAMTIP.2014.7073419. (Year: 2014).*

Rech et al., "A Decentralized Service-Platform towards Cross-Domain Entitlement Handling," 2019 IEEE International Conference on Blockchain (Blockchain), Atlanta, GA, USA, 2019, pp. 455-462, doi: 10.1109/Blockchain.2019.00069. (Year: 2019).*

Berger et al., "Security for the cloud infrastructure: Trusted virtual data center implementation," in IBM Journal of Research and Development, vol. 53, No. 4, pp. 6:1-6:12, Jul. 2009, doi: 10.1147/JRD.2009.5429060. (Year: 2009).*

Wentao et al., "Trusted remote attestation scheme based on property," 2010 International Conference on Computer Application and System Modeling (ICCASM 2010), Taiyuan, China, 2010, pp. V5-52-V5-57, doi: 10.1109/ICCASM.2010.5619358. (Year: 2010).*

Fongen et al., "The Integration of Trusted Platform Modules into a Tactical Identity Management System," MILCOM 2013—2013 IEEE Military Communications Conference, San Diego, CA, USA, 2013, pp. 1808-1813, doi: 10.1109/MILCOM.2013.305. (Year: 2013).*

Leicher et al., "Trusted Computing enhanced OpenID," 2010 International Conference for Internet Technology and Secured Transactions, London, UK, 2010, pp. 1-8. (Year: 2010).*

Shen et al., "The authentication and identity delegation about mobile agent system based on trusted computing platform," 2010 3rd International Conference on Computer Science and Information Technology, Chengdu, 2010, pp. 672-676, doi: 10.1109/ICCSIT.2010.5565104. (Year: 2010).*

Liang, et al., "The remote attestation design based on the identity and attribute certificates," 2014 11th International Computer Conference on Wavelet Actiev Media Technology and Information Processing(ICCWAMTIP), Chengdu, China, 2014, pp. 325-330, doi: 10.1109/ICCWAMTIP.2014.7073419. (Year: 2014).*

Raymond Ng, "Trusted Platform Module TPM Fundamental" APTISS, Aug. 2008, 40 pgs.

Amy Nelson, "Information Handling System Entitlement Validation", U.S. Appl. No. 16/126,809, filed Sep. 10, 2018, 22 pgs.

Robison et al., "Systems and Methods to Cryptographically Verify Information Handling System Configuration", U.S. Appl. No. 16/800,751, filed Feb. 25, 2020, 39 pgs.

TCG, "TPM Main Part 1 Design Principles", Revision 116, Mar. 1, 2011, 184 pgs.

TCG, "TPM Main Part 2 TPM Structures", Level 2, Revision 116, Mar. 1, 2011, 201 pgs.

TCG, "TPM Part 3 Commands", Level 2, Revision 116, Mar. 1, 2011, 339 pgs.

TCG, "Trusted Platform Module Library, Part 1: Architecture", Level 00, Revision 01.59, Nov. 8, 2019, 306 pgs.

TCG, "Trusted Platform Module Library, Part 2: Structures", Level 00, Revision 01.59, Nov. 8, 2019, 177 pgs.

TCG, "Trusted Platform Module Library, Part 3: Commands", Level 00, Revision 01.59, Nov. 8, 2019, 432 pgs.

TCG, "Trusted Platform Module Library, Part 3: Commands", Level 00, Revision 01.59, Nov. 8, 2019, 498 pgs.

TCG, "Trusted Platform Module Library, Part 4: Supporting Routines", Level 00, Revision 01.59, Nov. 8, 2019, 146 pgs.

TCG, "Trusted Platform Module Library, Part 4: Supporting Routines", Level 00, Revision 01.59, Nov. 8, 2019, 1009 pgs.

TCG, "Errata for TCG Trusted Platform Module Library", Level 00, revision 01.59, Nov. 8, 2019, 6 pgs.

* cited by examiner

SYSTEMS AND METHODS TO CRYPTOGRAPHICALLY VERIFY AN IDENTITY OF AN INFORMATION HANDLING SYSTEM

FIELD

This invention relates generally to information handling system security, and more particularly, to systems and methods for verifying system identity.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With increasing use and reliance on information handling system technology comes the need to secure and protect such devices from malicious use and intent. To improve system security, many information handling systems include a Trusted Platform Module (TPM) to assure platform integrity, provide secure storage of sensitive information, and perform remote attestation and other cryptographic functions. A TPM can be used to establish a strong root of trust for an IHS by ensuring that the boot process starts from a trusted combination of hardware and software, and continues until the operating system has fully booted and applications are running. In addition to assuring platform integrity, the TPM generates and uses cryptographic keys to verify or attest to the authenticity of various hardware and/or software components, and to bind and seal data/keys/applications to the platform. TPM architecture and implementation details are described in the *TPM Main Specification Version* 1.2 (published on Mar. 3, 2011) and the *TPM Library Specification* 2.0 (latest errata version 1.9 released Aug. 23, 2019), the entirety of which are incorporated herein by reference.

As known in the art, a TPM may generally include a microcontroller (or crypto-processor) to generate keys and perform cryptographic functions, persistent memory for storing small amounts of sensitive information (such as cryptographic keys) in a secure location, and versatile memory for storing platform metrics and additional keys. The TPM crypto-processor may generally include a hash generator and encryption-decryption engine to hash large blocks of data, and a key generation engine and random number generator to generate keys that can be used for attestation purposes.

Before a TPM leaves the manufacturing facility, the manufacturer generates an asymmetric key pair called Endorsement Keys (EK), which can be used to verify the authenticity of the TPM. The Endorsement Keys are non-migratable, stored inside the TPM and cannot be removed. Once a user takes ownership, the TPM may be used to generate additional keys, such as an Attestation Key (AK), a Storage Root Key (SRK) and additional storage and signing keys. The AK acts as an alias for the EK and can be used to attest to the validity of the platform's identity and configuration, while the SRK provides secure key storage by wrapping (encrypting) keys that may be stored outside of the TPM (e.g., within the system hard drive). The SRK forms the root of a key hierarchy including storage keys (as nodes) and signing keys (as leaves). Storage keys are generally used to encrypt/decrypt data, providing confidentiality and access control for the data itself. Signing keys are used to encrypt hash digests of data, and provide a means for a verifying party to confirm the integrity of the data (e.g., a message), and thus, confirm the origin of the hashed data.

A problem in today's information handling systems is the theft and misuse of system identity. Current system identifiers (such as service tags, product ID, and Extensible Provisioning Protocol ID, or ePPID) are mutable and prone to theft, and therefore, cannot be relied upon to verify that a system is the one it claims to be. This results in software, services and warranty items being utilized by and on fake systems. A need, therefore, exists for an improved system and method to irrefutably verify the identity of an information handling system.

SUMMARY OF THE INVENTION

The following description of various embodiments of systems and related methods is not to be construed in any way as limiting the subject matter of the appended claims.

In the present disclosure, various embodiments of systems and methods are provided herein to bind a system identifier that uniquely identifies an information handling system (IHS) to the system platform, so that the identity of the IHS can be verified. More specifically, the present disclosure provides methods to bind a unique system identifier to an IHS platform, and methods to cryptographically verify the identity of the IHS using the unique system identifier and a plurality of keys generated and stored with a Trusted Platform Module (TPM) of the IHS. Systems are provided herein to perform such methods. As such, the systems and methods disclosed herein enable system identity to be irrefutably verified, thereby preventing theft and misuse of system identity. Additional advantages and improvements provided by the systems and methods disclosed herein will become apparent upon reading this disclosure.

According to one embodiment, a system in accordance with the present invention may include a plurality of information handling systems (IHSs), a first remote system configured to store an entitlement database for the plurality of IHSs, and a second remote system coupled, via a network, to the first remote system and to the plurality of IHSs. Each IHS may have a unique system identifier (e.g., a service tag, product ID, or ePPID) that uniquely identifies the IHS and a trusted platform module (TPM) configured to store a private Endorsement Key (EK), an EK certificate containing a public EK, a public signing key and a private signing key. For each IHS, the entitlement database stored within the first remote system may associate the unique system identifier specified for the IHS with the EK certificate and the public signing key stored within the TPM of the IHS. Upon receiving a verification request to verify the identity of an IHS, the second remote system may communicate with the first remote system and with the IHS to cryptographically verify the identity of the IHS.

In some embodiments, the IHS may send the verification request and the unique system identifier specified for the IHS to the second remote system. Upon receiving the verification request and the unique system identifier, the second remote system may retrieve the EK certificate and the public signing key associated with the unique system identifier from the entitlement database stored within the first remote system. After retrieving the EK certificate and the public signing key, the second remote system may generate a nonce, encrypt the nonce with a public EK obtained from the EK certificate, and transmit the encrypted nonce to the IHS.

Upon receiving the encrypted nonce from the second remote system, the IHS may decrypt the encrypted nonce using the private EK stored within the TPM, sign the nonce and the unique system identifier using the private signing key stored within the TPM, and transmit a signed message containing the nonce and the unique system identifier to the second remote system.

Upon receiving the signed message containing the nonce and the unique system identifier, the second remote system may use the public signing key retrieved from the entitlement database to verify the nonce and the unique system identifier contained within the signed message, and transmit a verification response to the IHS. The second remote system may transmit a verification response to the IHS confirming the identity of the IHS if: (a) the nonce contained within the signed message matches the nonce generated by the second remote system, and (b) the unique system identifier contained within the signed message matches the unique system identifier sent with the verification request. On the other hand, the second remote system may transmit a verification response to the IHS denying the identity of the IHS if: (a) the nonce contained within the signed message does not match the nonce generated by the second remote system, or (b) the unique system identifier contained within the signed message does not match the unique system identifier sent with the verification request.

Upon receiving the verification response from the second remote system, the IHS may perform one or more actions based on the verification response. If the identity of the IHS is confirmed, the IHS may in some embodiments be granted an elevated level of trust by the second remote system to perform trusted actions on behalf of the second remote system. Examples of trusted actions that may be performed on behalf of the second remote system may include, but are not limited to, locally collecting and transmitting telemetry data, launching a trusted application to perform action(s) on behalf of the second remote system, etc.

If the identity of the IHS cannot be confirmed (i.e., if the identity is denied), however, the IHS may be limited or restricted to a reduced level of trust by the second remote system. In addition or alternatively, the second remote system may alert a user or an administrator of a potential problem with the IHS identity and/or may trigger one or more remedial actions to be taken by the IHS, if the identity of the IHS cannot be confirmed. Example remedial actions that may be taken by the IHS if the identity of the IHS cannot be confirmed include, but are not limited to, revoking user access to the IHS, deleting data or program code, limiting functionality of the IHS until the problem with the identity is resolved, etc. Other actions may also be performed if the identity of the IHS cannot be confirmed.

According to another embodiment, a method performed by an information handling system (IHS) is provided herein to verify an identity of the IHS. In general, the method may include generating and storing a plurality of keys within a trusted platform module (TPM) of the IHS, wherein the plurality of keys include a public signing key and a private signing key; sending a verification request to verify the identity of the IHS, along with a unique system identifier specified for the IHS, to a remote system; and communicating with the remote system to cryptographically verify the identity of the IHS.

In some embodiments, said communicating may include receiving an encrypted nonce from the remote system; decrypting the encrypted nonce using a private Endorsement Key (EK) stored within the TPM; signing the nonce and the unique system identifier using the private signing key stored within the TPM; transmitting a signed message containing the nonce and the unique system identifier to the remote system; and receiving a verification response from the remote system.

In some cases, a verification response may be received from the remote system confirming the identity of the IHS if: (a) the nonce contained within the signed message matches the nonce received from the remote system, and (b) the unique system identifier contained within the signed message matches the unique system identifier sent along with the verification request. In other cases, a verification response may be received from the remote system denying the identity of the IHS if: (a) the nonce contained within the signed message does not match the nonce received from the remote system, or (b) the unique system identifier contained within the signed message does not match the unique system identifier sent along with the verification request.

In some embodiments, the method may further include performing one or more actions based upon the verification request received from the remote system. If the verification response denies the identity of the IHS, for example, said performing one or more actions may include, but are not limited to: alerting an administrator that the identity of the IHS has been modified, revoking user access to the IHS, deleting data or program code, and/or limiting functionality of the IHS. Other actions may also be performed when the verification response denies the identity of the IHS.

According to another embodiment, a method performed by a remote system to is provided herein to verify an identity of an information handling system (IHS). In general, the method may include receiving a verification request to verify the identity of the IHS, along with a unique system identifier specified for the IHS; using the unique system identifier to retrieve an Endorsement Key (EK) certificate and a public signing key associated with the unique system identifier from an entitlement database stored within another remote system; and communicating with the IHS to cryptographically verify the identity of the IHS.

In some embodiments, said communicating may include generating a nonce; encrypting the nonce with a public EK obtained from the EK certificate; and transmitting the encrypted nonce to the IHS. In some embodiments, said communicating may further include receiving a signed message containing the nonce and the unique system identifier, wherein the signed message is generated by a trusted platform module (TPM) of the IHS using a private signing key stored within the TPM; using the public signing key retrieved from the entitlement database to verify the nonce and the unique system identifier contained within the signed message; and transmitting a verification response to the IHS.

In some cases, a verification response may be transmitted to the IHS confirming the identity of the IHS if: (a) the nonce contained within the signed message matches the generated nonce, and (b) the unique system identifier contained within the signed message matches the unique system identifier received along with the verification request. In other cases, a verification response may be transmitted to the IHS denying the identity of the IHS if: (a) the nonce contained within the signed message does not match the generated nonce, or (b) the unique system identifier contained within the signed message does not match the unique system identifier received along with the verification request.

BRIEF DESCRIPTION OF THE DRAWINGS

Other advantages of the present disclosure will become apparent upon reading the following detailed description and upon reference to the accompanying drawings in which.

Figure 1:
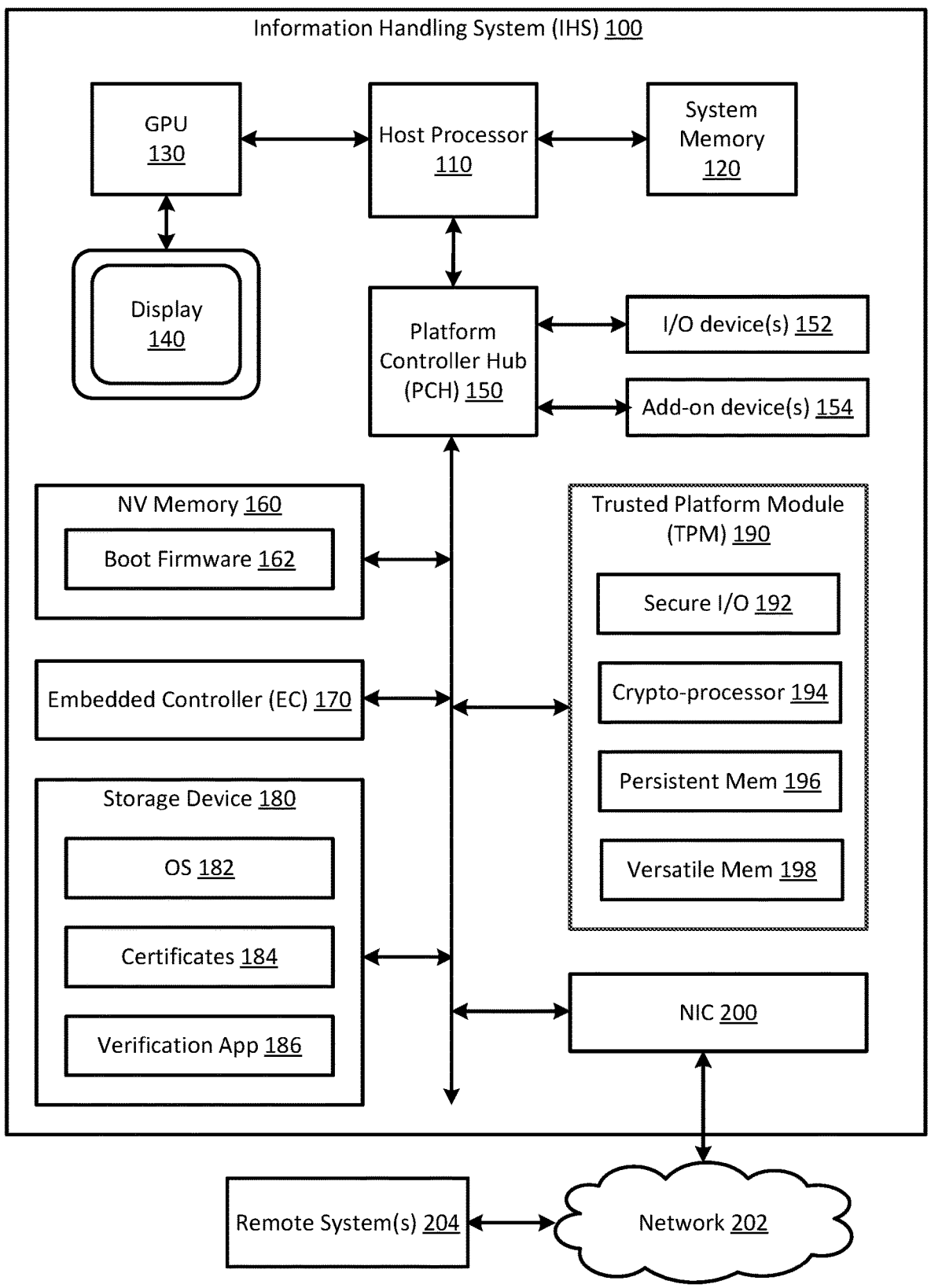
FIG. 1 is a block diagram illustrating one embodiment of an information handling system (IHS) including a processing device configured to execute program instructions (e.g., a verification application) to cryptographically verify the identity of the IHS using a system identifier that uniquely identifies the IHS and a plurality of keys generated and stored securely within a Trusted Platform Module (TPM) of the IHS.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Generally speaking, the present disclosure provides various embodiments of systems and methods to bind a system identifier that uniquely identifies an information handling system (IHS) to the system platform, so that the identity of the IHS can be cryptographically verified. More specifically, the present disclosure provides methods to bind a unique system identifier to an IHS platform, and methods to cryptographically verify the identity of the IHS using the unique system identifier and a plurality of keys generated and stored with a Trusted Platform Module (TPM) of the IHS. Systems are also provided herein to perform such methods. As such, the systems and methods disclosed herein enable system identity to be irrefutably verified, thereby preventing theft and misuse of system identity. Additional advantages and improvements provided by the systems and methods disclosed herein will become apparent upon reading this disclosure.

FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 includes at least one processing device (e.g., at least one host processor) 110, a system memory 120, a graphics processor unit (GPU) 130, a display device 140, a platform controller hub (PCH) 150, one or more input/output (I/O) devices 152, one or more add-on devices 154, a computer readable non-volatile (NV) memory 160, an embedded controller (EC) 170, a computer readable storage device 180, a Trusted Platform Module (TPM) 190 and a network interface card (NIC) 200.

It is expressly noted that the configuration shown in FIG. 1 is exemplary only, and that the various methods disclosed herein for binding and cryptographically verifying the identity of an information handling system may be implemented on any type and/or configuration of IHS having at least at least one processing device, a computer readable storage device, a TPM and a NIC. It will be further understood that while certain components of an information handling system are shown in FIG. 1 for illustrating embodiments of the present disclosure, the information handling system disclosed herein is not restricted to including only those components shown in FIG. 1 and described below.

Host processor 110 is configured to execute program instructions (or computer program code) for the IHS, and may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. As described in more detail below, host processor 110 may execute program instructions (e.g., verification application 186) to cryptographically verify the identity of the IHS using a system identifier that uniquely identifies the IHS and a plurality of keys generated and stored within TPM 190.

System memory 120 is coupled to host processor 110 and configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images to the user. In some embodiments, IHS 100 may include other types of processing devices including, but not limited to, a graphics-derivative processor (such as a physics/gaming processor), a digital signal processor (DSP), a security processor, and/or a trusted execution environment (such as Intel SGX, Intel TXT, a Global Platform TEE, Intel TXE, Intel CSME, AMD PSP, etc.).

Platform controller hub (PCH) 150 is coupled to host processor 110 and configured to handle I/O operations for the IHS. As such, PCH 150 may include a variety of communication interfaces and ports for communicating with various IHS components, such as input/output (I/O) device(s) 152, add-on device(s) 154, computer readable NV memory 160, EC 170, computer readable storage device 180, TPM 190 and NIC 200. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

I/O device(s) 152 enable the user to interact with IHS 100 and the software/firmware executing thereon. In some embodiments, one or more I/O devices 152 may be provided within IHS 100. In other embodiments, I/O device(s) 152 may be separate from the IHS and may interact with the IHS through a wired or wireless connection. Examples of I/O devices 152 include, but are not limited to, keyboards, keypads, touch screens, mice, scanning devices, voice or optical recognition devices, and any other devices suitable for entering or retrieving data.

Add-on device(s) 154 provide additional functionality to the IHS and may be coupled to one or more of the communication interfaces and ports contained within PCH 150. Examples of add-on devices 154 include, but are not limited to, a video card, sound card, small system computer interface (SCSI) controller, hardware RAID controller, serial/parallel port card, IEEE 1394 cards, Thunderbolt™ card, USB controller card, SATA/eSATA controller card, PS/2 controller card, non-volatile memory card, PCH storage, CPU storage, etc.

Computer readable NV memory 160 is configured to store boot firmware (FW) 162 and other system firmware (not shown), and may include any suitable type of non-volatile memory and/or Flash memory device. Boot firmware 262 may generally include software and/or firmware modules for specifying hardware configuration settings, system date/time, boot sequence, etc., and may be implemented as a Basic Input/Output System (BIOS) and/or a Unified Extensible Firmware Interface (UEFI).

Embedded controller (EC) 170 may be configured to boot the information handling system and perform other functions. EC 170 may generally include read only memory (ROM), random access memory (RAM) and a processing device (e.g., a controller, microcontroller, microprocessor, ASIC, etc.) for executing program instructions stored within its internal ROM and RAM. For example, EC 170 may be configured to execute program instructions (e.g., a boot block) stored within its internal ROM to initiate a boot process for the information handling system.

Each time IHS 100 is powered on or rebooted, an IHS processing device (e.g., host processor 110 and/or EC 170) executes boot firmware 162 to test and initialize IHS hardware components, perform a Power-On Self-Test (POST) to ensure the hardware configuration is valid and working properly, load an operating system (OS) from computer readable storage device 180, and/or perform a variety of other actions known in the art. Once the OS is loaded and running, an OS application may read component identifiers associated with various hardware components (e.g., host processor 110, system memory 120, GPU 130, PCH 150, add-on devices 154, NV memory 160, EC 170, storage device 180, NIC 200 etc.) of the IHS, and may store the component identifiers within system tables (e.g., SMBIOS or ACPI) or system memory locations accessible to the verification application 186. Examples of component identifiers include, but are not limited to, a vendor ID (VID), a device ID (DID) and a serial number (SN).

Computer readable storage device 180 is configured to store software and/or data, and may include any type of persistent, non-transitory computer readable storage device, such as one or more hard disk drives (HDDs) or solid-state drives (SSDs). For example, computer readable storage device 180 may be configured to store an operating system (OS) 182 for the IHS, in addition to other software and/or firmware modules and user data. As shown in FIG. 1, computer readable storage device 180 may also store certificates 184 and program instructions (e.g., a verification application) 186 that can be executed by host processor 110 to cryptographically verify the identity of IHS 100.

In some embodiments, certificates 184 may include a Platform Attribute (PA) certificate, which is created and used in present disclosure to bind system attributes to the system platform. For example, a PA certificate may include a unique system identifier (e.g., a service tag, product ID, or ePPID) that uniquely identifies the IHS, and component identifiers (e.g., a vendor ID, device ID, serial number, etc.) that identify one or more hardware components contained within the IHS. In some embodiments, the unique system identifier and component identifiers may be communicated to a remote system 204 (e.g., entitlement system 310). Once the unique system identifier and component identifiers are combined within a PA certificate and signed, the PA certificate may be transmitted back to the IHS 100 and stored within computer readable storage device 180.

Verification application 186 contains program instructions, which may be executed by host processor 110 to cryptographically verify the identity of IHS 100. As described in more detail below, verification application 186 may send a request to a remote system 240 (e.g., verification system 320) to cryptographically verify the identity of IHS 100, and may act as an intermediary between the remote system and TPM 190. Additional details of verification application 186 are described in more detail below in reference to FIGS. 3, 5 and 8.

Trusted Platform Module (TPM) 190 is a tamper-resistant integrated circuit or microcontroller that can be used to assure platform integrity, provide secure storage of sensitive information, and perform remote attestation and other cryptographic functions. TPM 190 establishes a strong root of trust for the IHS by ensuring that the boot process starts from a trusted combination of hardware and software, and continues until the operating system has fully booted and applications are running. In the present disclosure, TPM 190 is also used to cryptographically verify the identity of IHS 100.

Figure 2:
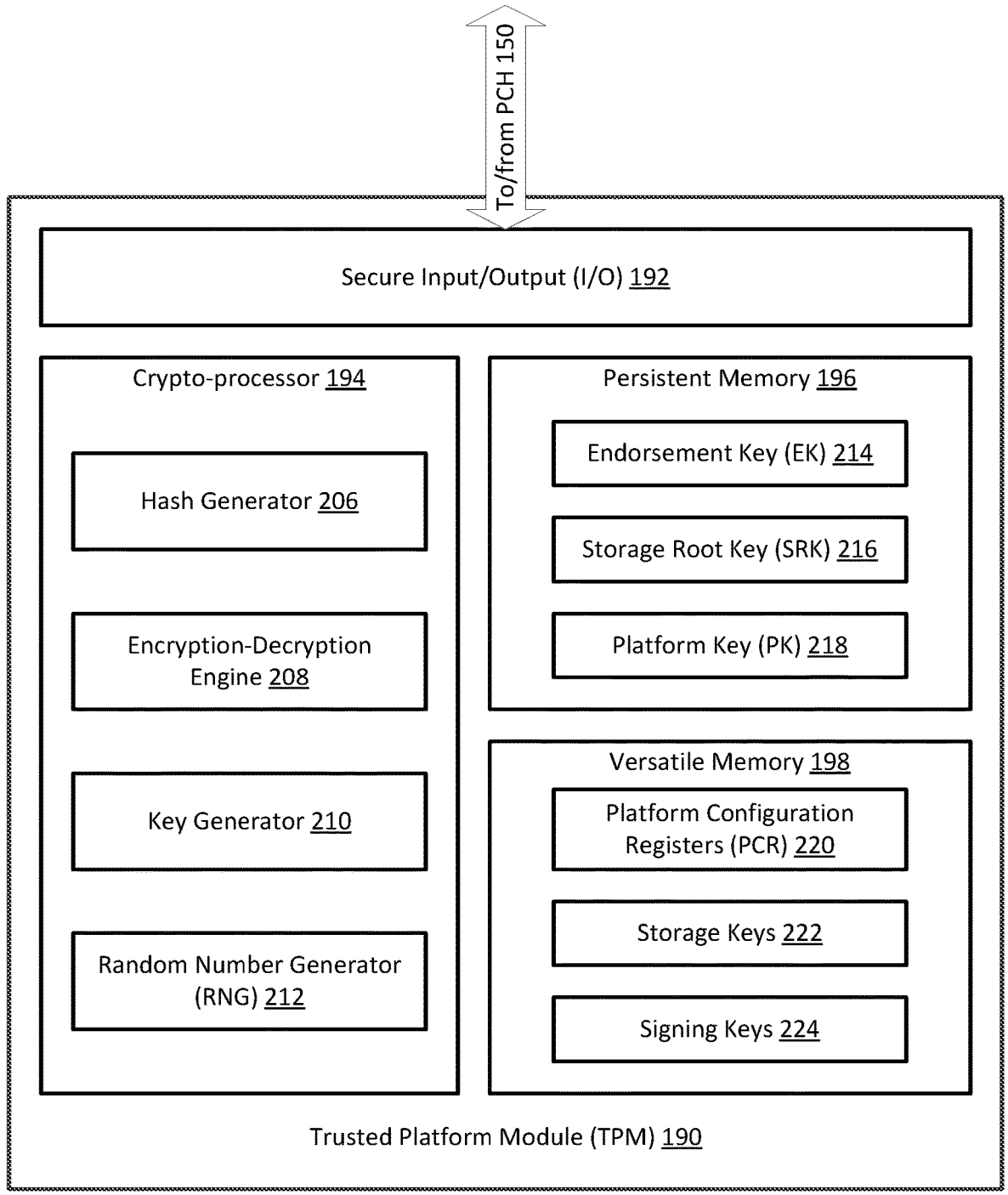
FIG. 2 is a block diagram illustrating one embodiment of a TPM configured to generate and store a plurality of keys.

As shown in FIGS. 1 and 2, TPM 190 includes a secure I/O interface 192 for communicating with PCH 150, a crypto-processor 194 for generating keys and performing cryptographic functions, a persistent memory 196 for storing small amounts of sensitive information (such as cryptographic keys) in a secure location, and a versatile memory 198 for storing platform metrics and additional keys. The TPM crypto-processor 194 includes a hash generator 206 to hash large blocks of data, an encryption-decryption engine 208 to encrypt/decrypt data, and a key generator 210 and random number generator 212 to generate a plurality of keys, which may be stored within a secure location of TPM 190 (e.g., within non-volatile memory) and used for attestation purposes.

For example, Endorsement Key (EK) 214, Storage Root Key (SRK) 216 and Platform Key (PK) 218 may be generated and stored within persistent memory 196 of TPM 190. The Endorsement Key (EK) 214 is an asymmetric key pair consisting of a public key and private key, which can be used to verify the authenticity of TPM 190. The private EK is securely stored within the TPM 190, and is never exposed or removed from the TPM. The public EK, on the other hand, can be read from the TPM and is typically included within an EK certificate, which is stored within the TPM and used to guarantee the validity of the EK asymmetric key pair. The Storage Root Key (SRK) 216 is another asymmetric key pair, which can be used to provide secure key storage by wrapping (encrypting) keys that may be stored outside of the TPM. The SRK 216 forms the root of a key hierarchy containing one or more storage keys 220 (as nodes) and signing keys 222 (as leaves). The Platform Key (PK) 218 is another asymmetric key pair, which can be used to establish a trust relationship between the platform owner and the boot firmware 162 by controlling access to a Key Exchange Key (KEK) database, which establishes a trust relationship between the boot firmware 162 and the OS 182.

At each system boot, TPM 190 performs a cryptographic hash of hardware and software configuration settings, which are stored within the Platform Configuration Registers (PCRs) 218 of the TPM in versatile memory 198. In addition, one or more storage keys 222 and/or signing keys 224 may also be generated and stored within versatile memory 198. For example, TPM 190 may be used to generate a pair of System Identity (ID) signing keys 224, which can be used to cryptographically verify the identity of IHS 100. Like the private EK, the private key portion of the System ID signing key 224 is securely stored within the TPM 190, and is never exposed or removed from TPM 190. However, the public key portion of the System ID signing key 224 can be accessed and read from the TPM. In some embodiments, the public System ID signing key 224 can be communicated to, and stored with, a remote system 204 (e.g., entitlement system 310) along with the EK certificate and the PA certificate.

NIC 200 enables IHS 100 to communicate with one or more remote systems 204 via network 202. In some embodiments, IHS 100 may utilize NIC 200 and network 202 to communicate with one or more remote systems 204 (e.g., entitlement system 310 and/or verification system 320) to bind and cryptographically verify the identity of IHS 100, as shown in FIGS. 3-8 and described in more detail below. For purposes of this discussion, network 202 is indicated as a single collective component for simplicity. However, it is appreciated that network 202 may comprise one or more direct connections to other remote systems, as well as a more complex set of interconnections as can exist within a wide area network, such as the Internet. For example, network 202 may be a local area network (LAN), wide area network (WAN), personal area network (PAN), or the like, and the connection to and/or between IHS 100 and network 202 may be wired, wireless or a combination thereof.

As noted above, identifiers (such as service tags, product ID, and ePPID) currently used to identify information handling systems are prone to theft and misuse, and therefore, cannot be relied upon to irrefutably verify that a system is the one it claims to be. For example, system manufacturers often use service tags (and/or service code numbers) to identify information handling systems, and may associate software, services and/or warranty items that have been purchased for the system with a particular service tag. Unfortunately, service tags are not securely stored or cryptographically protected, and are often printed on a sticker adhered to the chassis of the information handling system. This makes it easy for malicious users to "borrow" system identity, so that software, services and warranty items purchased for valid systems can be used on fake systems.

To overcome this problem, the present disclosure provides various embodiments of systems and related methods to bind and cryptographically verify system identity. More specifically, systems and methods are provided herein to bind a system identifier that uniquely identifies an IHS to the system platform, and to use the unique system identifier and a plurality of keys generated and stored within a TPM of the IHS to cryptographically verify the identity of the IHS. In doing so, the present disclosure prevents malicious users from "borrowing" system identity and utilizing software, services and warranty items on fake systems.

Figure 3:
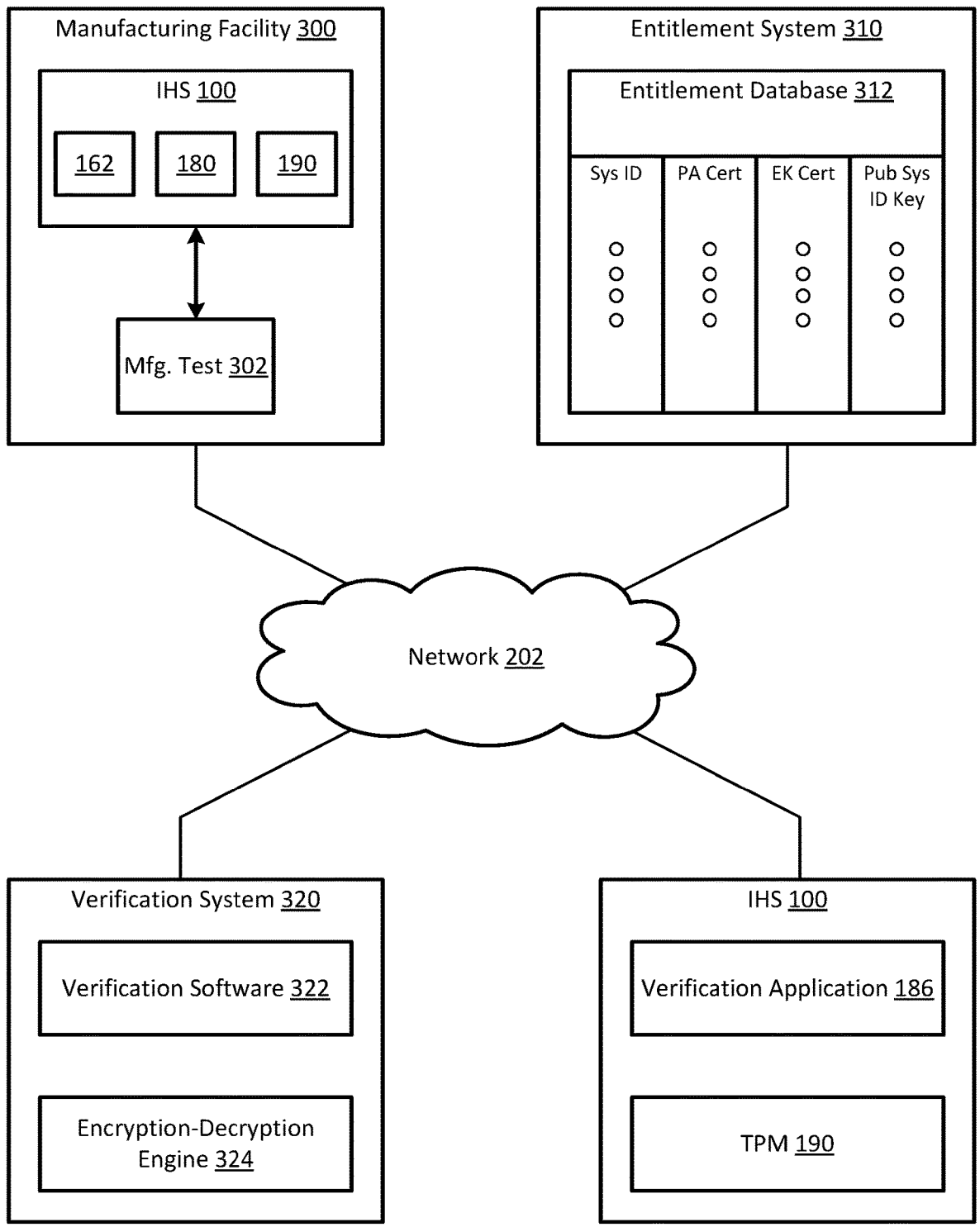
FIG. 3 is a block diagram illustrating one embodiment of a system, which may be used to bind a unique system identifier to an IHS platform and cryptographically verify the identity of the IHS.
Figure 4:
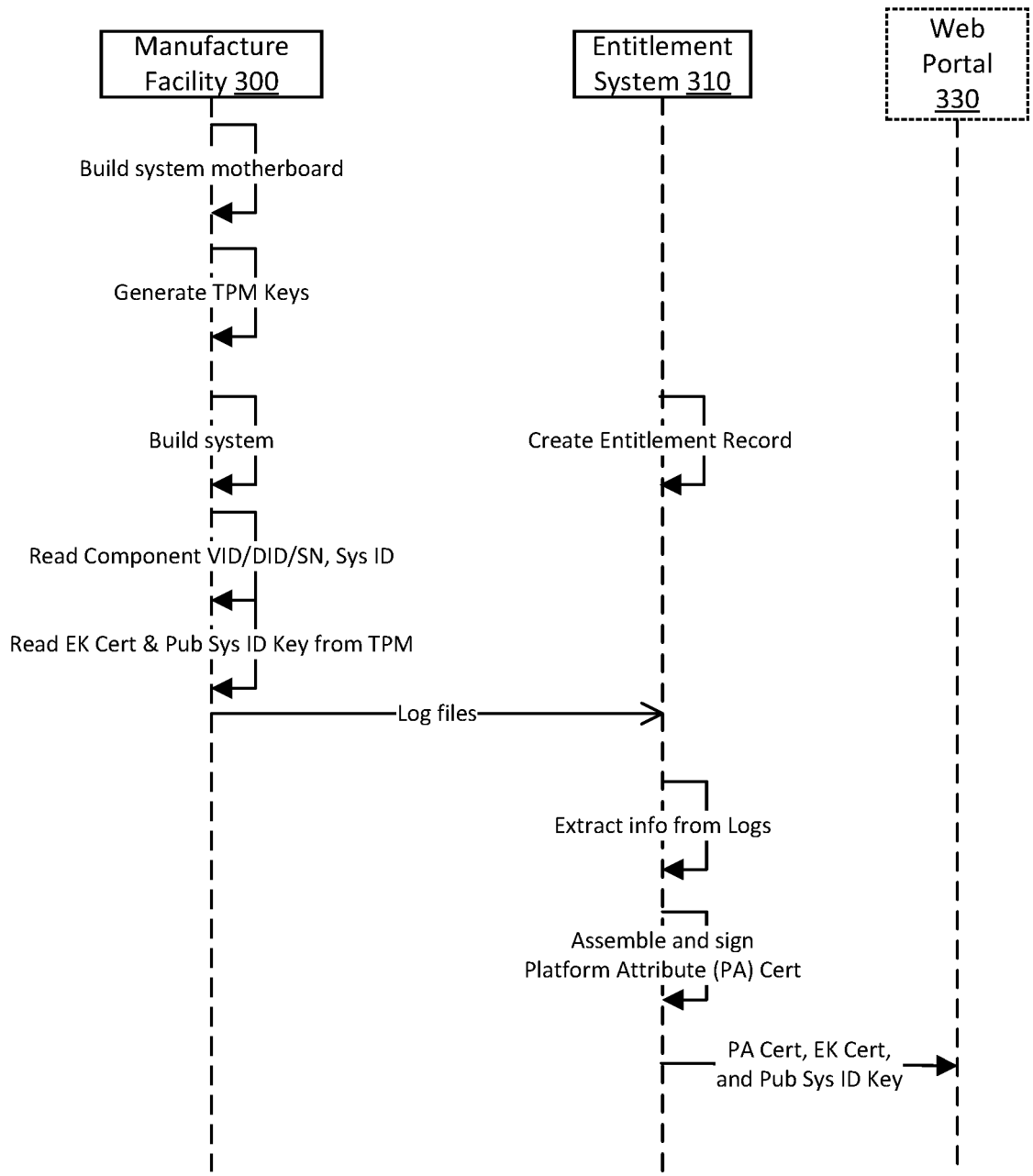
FIG. 4 is a process flow diagram for binding a unique system identifier to an IHS platform.
Figure 5:
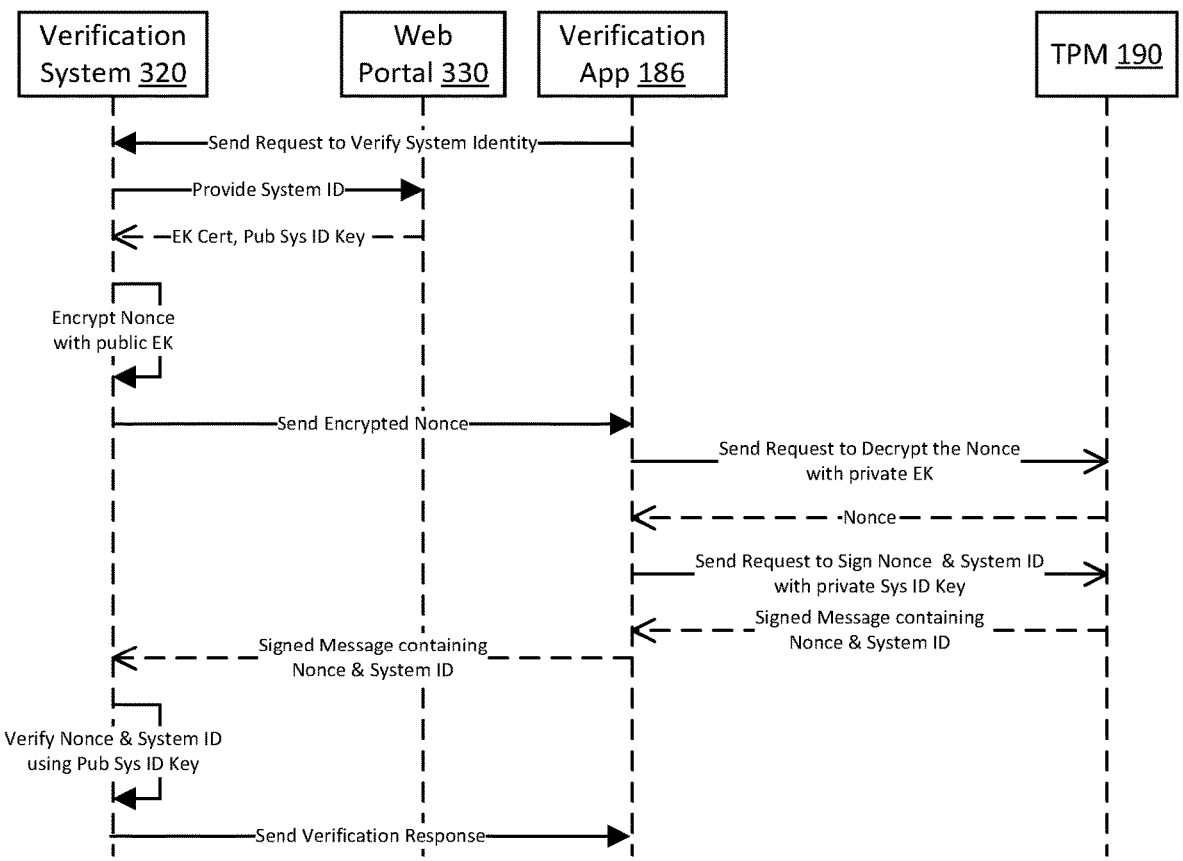
FIG. 5 is a process flow diagram for cryptographically verifying the identity of an IHS using a unique system identifier that uniquely identifies the IHS and a plurality of keys securely stored with a TPM of the IHS.

FIG. 3 illustrates one embodiment of a system that can be used to bind a unique system identifier to an information handling system (IHS), so that the identity of the IHS may be cryptographically verified. FIG. 4 illustrates one embodiment of a process flow, which may be performed by components of the system shown in FIG. 3 to bind a unique system identifier to an IHS. FIG. 5 illustrates one embodiment of a process flow, which may be performed by components of the system shown in FIG. 3 to cryptographically verify the identity of an IHS using the unique system identifier and a plurality of keys generated and stored within a TPM of the IHS.

As shown in FIGS. 3 and 4, a plurality of information handling systems (such as IHS 100) are built at a manufacturing facility 300. During manufacture at test of the system platform components by manufacture test equipment 302, such as during the programming of the boot firmware 162 and pre-boot code, TPM 190 is used to generate a plurality of keys including, but not limited to, a System ID signing key 224. As noted above, an Endorsement Key (EK) 214 may be generated and stored within TPM 190 during TPM manufacture. The EK 214 and System ID signing key 224 are asymmetric key pairs, each consisting of a public key and a private key. The private EK and the private System ID signing key are stored securely within TPM 190 (e.g., within persistent memory 196 and versatile memory 198) and are never exposed. The public EK and the public System ID signing key, however, can be read from the TPM and used for verification purposes.

After an information handling system (such as IHS 100) is built according to ordered specifications and an entitlement record is created, manufacturer test equipment 302 may read a unique system identifier (e.g., a service tags, product ID, or ePPID) and one or more component identifiers (e.g., a vendor ID, device ID, serial number, etc.) from system tables (e.g., SMBIOS or ACPI) or system memory locations. In some cases, component identifier(s) may be read directly from one or more system components, for example, by reading the component identifier(s) from memory mapped I/O, PCI configuration space or other memory locations within the system component(s). In addition, manufacturer test equipment 302 accesses TPM 190 to read the EK certificate (containing the public EK) and the public System ID signing key stored therein.

In some embodiments, manufacturer test equipment 302 may transmit the unique system identifier, component identifier(s), EK certificate and public System ID signing key to an entitlement system 310 via network 202. In such embodiments, entitlement system 310 may combine the unique system identifier and component identifier(s) received from manufacturer test equipment 302 into a Platform Attribute (PA) certificate. After assembling and signing the PA certificate, entitlement system 310 may store the PA certificate, the EK certificate and the public System ID signing key within a local database (e.g., entitlement database 312). In some embodiments, entitlement system 310 may transmit the signed PA certificate back to the manufacturer test equipment 300, so that it can be stored as certificates 184 within computer readable storage device 180 of IHS 100. In some embodiments, entitlement system 310 may provide the PA certificate, the EK certificate and the public System ID signing key to a web portal 330, as shown in FIG. 4 and described in more detail below.

Entitlement system 310 is an information handling system (e.g., a server), which manages hardware and software entitlements for information handling systems (e.g., desktop computers, laptop computers, tablets, servers, etc.) manufactured and/or built by the manufacturer. Entitlement system 310 is a remote system, which may be coupled to manufacturing facility 300, verification system 320 and/or IHS 100 via network 202. In the embodiment shown in FIG. 3, entitlement system 310 manages an entitlement database 312, which associates a unique system identifier (e.g., service tags, product ID, or ePPID) specified by the manufacturer for each information handling system with a PA certificate, EK certificate, and public System ID signing key created for the IHS. By associating the unique system identifier with the PA certificate, EK certificate, and public System ID Signing Key, entitlement database 312 binds the unique system identifier to the IHS platform.

After IHS 100 leaves manufacturing facility 300 and a user takes ownership of the IHS, entitlement database 312 may be used to verify the identity of the IHS. As shown in FIGS. 3 and 5, for example, a processing device of IHS 100 may execute program instructions contained within a verification application 186 to cryptographically verify the identity of the IHS. To begin the verification process, verification application 186 sends a verification request, via network 202, asking a remote system (such as verification system 320) to verify the identity of the IHS. A system identifier (e.g., a service tag, product ID, or ePPID) uniquely identifying the IHS may be included within the verification request, or may be sent along with the verification request to verification system 320. In some embodiments, a verification request may be triggered by policy, or may be sent periodically and/or upon system start-up.

Verification system 320 is an information handling system (e.g., a server), which can be used to verify the identity of information handling systems (e.g., desktop computers, laptop computers, tablets, servers, etc.) manufactured and/or built by manufacturer 300. As shown in FIG. 3, verification system 320 is a remote system, which is coupled to IHS 100 via network 202 and includes verification software 322 and an encryption-decryption engine 324. Upon receiving a verification request from verification application 186, verification system 320 executes verification software 322 to retrieve information stored within the entitlement database 312 and to use the retrieved information to verify the identity of IHS 100. For example, verification system 320 may use the unique system identifier (provided along with the request) to retrieve the EK certificate and public System ID signing key, which are associated with the unique system identifier and stored within entitlement database 312. In some embodiments, verification system 320 may access the entitlement database 312 through a web portal 330, as shown in FIG. 5.

Upon receiving the EK certificate and public System ID signing key associated with the unique system identifier, verification system 320 generates a nonce (e.g., a random number), uses the public EK contained with the EK certificate to encrypt the nonce, and transmits the encrypted nonce to IHS 100. Upon receiving the encrypted nonce, verification application 186 sends a request to TPM 190 asking the TPM to decrypt the nonce using the private EK stored within the TPM. Upon receiving a decrypted nonce from TPM 190, verification application 186 sends another request to TPM 190 asking the TPM to sign the nonce and the unique system identifier using the private System ID signing key stored within the TPM. Once a signed message containing the nonce and the unique system identifier is received from TPM 190, verification application 186 transmits the signed message to verification system 320 for further verification.

Upon receiving the signed message, verification system 320 uses the public System ID signing key obtained from entitlement database 312 to verify the nonce and the unique system identifier contained within the signed message. More specifically, verification system 320 may use the public System ID signing key to verify that: (a) the nonce contained within the signed message matches the nonce generated by the verification system 320, and (b) the unique system identifier contained within the signed message matches the unique system identifier provided along with the verification request.

If a match exists for both the nonce and the unique system identifier, verification system 320 sends a verification response to verification application 186 confirming the identity of the IHS 100. If the identity of the IHS is confirmed, verification system 320 may grant IHS 100 an elevated level of trust, which may enable the IHS to perform trusted actions on behalf of the verification system. Examples of trusted actions that may be performed on behalf of verification system 320 include, but are not limited to, locally collecting and transmitting telemetry data, and launching a trusted application to perform action(s) on behalf of the verification system.

If a match does not exist for the nonce and/or the unique system identifier, verification system 320 sends a verification response to verification application 186 denying the identity of the IHS 100. If the identity of the IHS cannot be confirmed (i.e., if the identity is denied), IHS 100 may be limited or restricted to a reduced level of trust by the verification application 186. In addition or alternatively, verification application 186 may alert a user or an administrator that there is a potential problem with the IHS identity, and/or may trigger one or more remedial actions to be taken, if the identity of the IHS cannot be confirmed. Example remedial actions that may be taken if the identity of the IHS cannot be confirmed include, but are not limited to, revoking user access to the IHS, deleting data or program code and/or limiting functionality of the IHS until the problem with the identity is resolved. Other actions may also be performed if the identity of the IHS cannot be confirmed.

Figure 6:
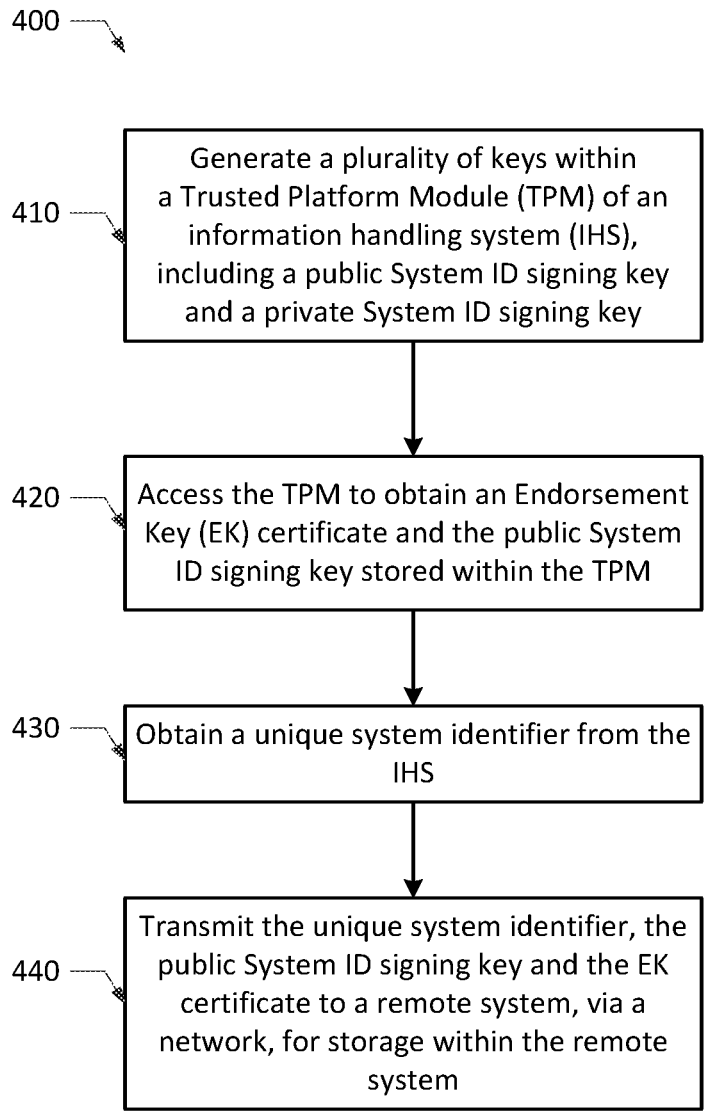
FIG. 6 is a flow chart diagram illustrating one embodiment of a method to bind a unique system identifier to an IHS platform.
Figure 7:
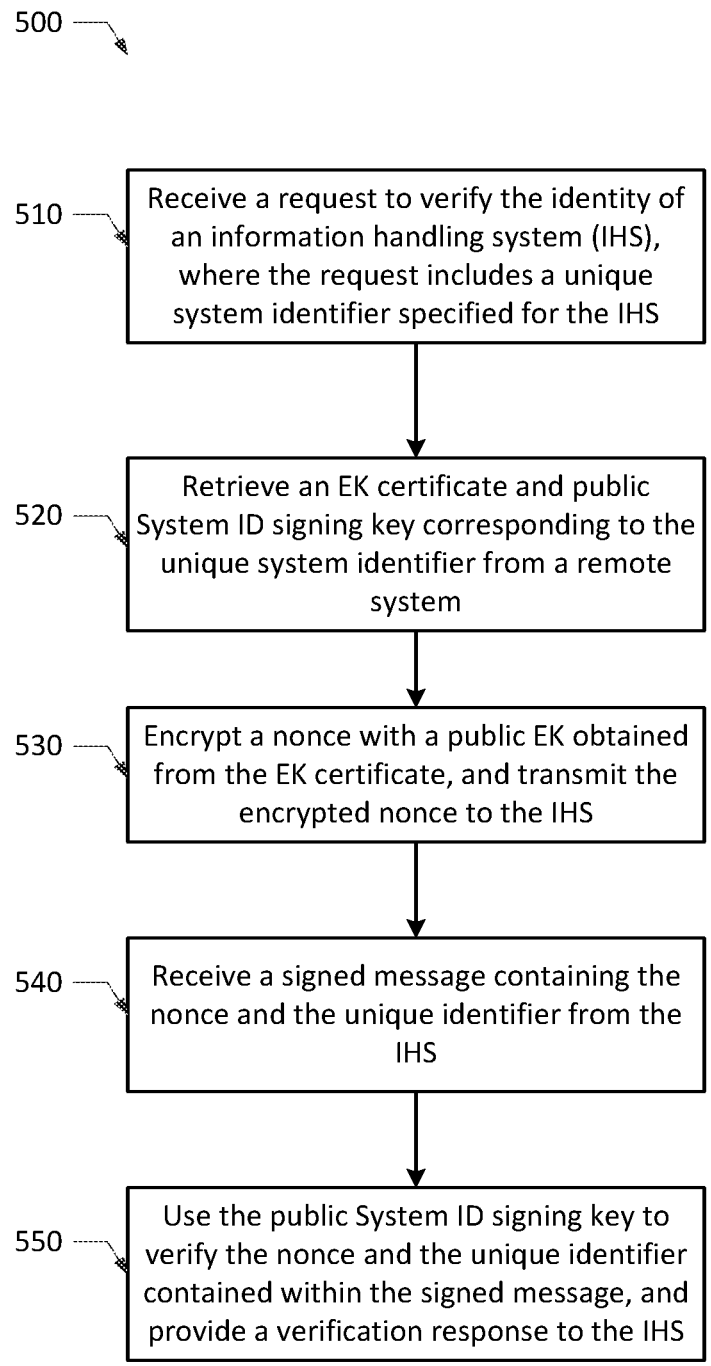
FIG. 7 is a flow chart diagram illustrating example method steps performed by a remote system (e.g., a verification system) to cryptographically verify the identity of an IHS.
Figure 8:
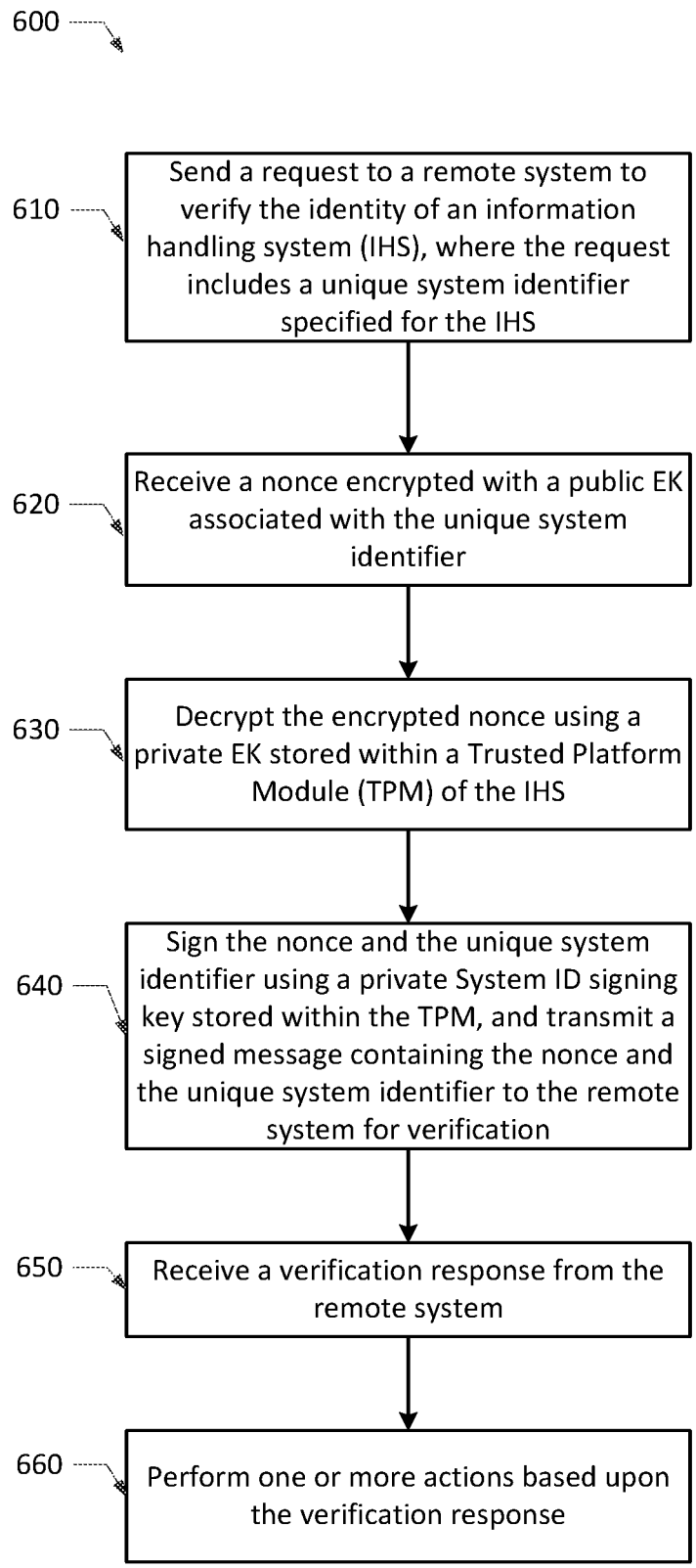
FIG. 8 is a flow chart diagram illustrating example method steps performed by an IHS to cryptographically verify the identity of the IHS.

FIGS. 6-8 are flow chart diagrams illustrating various embodiments of methods that may be used to bind a unique system identifier to an information handling system (IHS) platform, so that the identity of the IHS may be cryptographically verified. More specifically, FIG. 6 illustrates one embodiment of a method 400 that may be used to bind a unique system identifier to an information handling system platform during manufacturing (e.g., at manufacturing facility 300). After an IHS leaves the manufacturing facility, the methods 500, 600 shown in FIGS. 7 and 8 may be used to cryptographically verify the identity of the IHS. More specifically, FIG. 7 illustrates method steps performed by a remote system (e.g., verification system 320), while FIG. 8 illustrates method steps performed by an information handling system (e.g., IHS 100) to cryptographically verify the identity of the IHS using the unique system identifier and a plurality of keys generated and stored within a Trusted Platform Module (TPM) of the IHS.

As shown in FIG. 6, method 400 may begin (in step 410) by generating a plurality of keys within a TPM of an information handling system. In the present disclosure, the TPM may be used to generate a System ID signing key asymmetric key pair, including a public System ID signing key and a private System ID signing key in step 410. In step 420, method 400 accesses the TPM to obtain the Endorsement Key (EK) certificate and the public System ID signing key stored within the TPM. In step 430, method 400 obtains a unique system identifier (e.g., a service tag, product ID, or ePPID) from the IHS. In step 440, the unique system identifier, the Endorsement Key (EK) certificate and the public System ID signing key are transmitted, via a network, to a remote system (e.g., entitlement system 310 and/or web portal 330) for storage therein. In some embodiments, the remote system may contain a database, which associates and binds the unique system identifier to the EK certificate and public System ID signing key obtained from the IHS.

As shown in FIG. 7, method 500 may begin (in step 510) upon receiving a request from an information handling system (IHS) to verify the identity of the IHS. As noted above, the verification request may include a unique system identifier (e.g., a service tag, product ID, or ePPID) that uniquely identifies the IHS. In step 520, method 500 uses the unique system identifier to retrieve an EK certificate and a public System ID signing key corresponding to the unique system identifier from a remote system (e.g., entitlement system 310 and/or web portal 330). In step 530, method 500 uses the public EK contained with the EK certificate to encrypt a nonce (e.g., a random number), and transmits the encrypted nonce to the IHS. As noted above and described in more detail below in reference to FIG. 8, a Trusted Platform Module (TPM) contained within the IHS may be used to decrypt the nonce and provide a signed message containing the nonce and the unique system identifier.

In step 540, method 500 receives the signed message containing the nonce and the unique system identifier from the IHS. In step 550, method 500 uses the public System ID signing key obtained from the remote system to verify the nonce and the unique system identifier contained within the signed message, and provides a verification response to the IHS. In some embodiments, method step 550 may send a verification response to the IHS confirming the identity of the IHS if: (a) the nonce contained within the signed message matches the nonce encrypted in step 530, and (b) the unique system identifier contained within the signed message matches the unique system identifier received with the verification request in step 510.

As shown in FIG. 8, method 600 may begin (in step 610) by sending a request to a remote system (e.g., verification system 320) to verify the identity of an information handling system (IHS). As noted above, the verification request may include a unique system identifier (e.g., a service tag, product ID, or ePPID) that uniquely identifies the IHS. In step 620, method 600 receives a nonce encrypted with a public EK associated with the unique system identifier. In step 630, method 600 uses a private EK stored within a Trusted Platform Module (TPM) of the IHS to decrypt the encrypted nonce. In step 640, method 600 signs the nonce and the unique system identifier using a private System ID signing key stored within the TPM, and transmits a signed message containing the nonce and the unique system identifier to the remote system for verification. In step 650, method 600 receives a verification response from the remote system. As noted above, the verification response may confirm or deny the identity of the IHS. In step 660, method 600 performs one or more actions based upon the verification response received from the remote system.

In some embodiments, the IHS may perform one or more trusted actions (in step 660) on behalf of the remote system if the verification response received in step 650 confirms the identity of the IHS. Examples of trusted actions that may be performed on behalf of the remote system include, but are not limited to, locally collecting and transmitting telemetry data, and launching a trusted application to perform action(s) on behalf of the verification system. If the verification response received in step 650 denies the identity of the IHS, the one or more actions performed by the IHS (in step 660) may include alerting an administrator that the identity of the IHS has been modified, revoking user access to the IHS, deleting data or program code, limiting functionality of the IHS until the problem with the identity is resolved, etc. Other actions may also be performed in step 660 based on the verification response received in step 650.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A system, comprising:
    a plurality of information handling systems (IHSs), each having:
        a processing device;
        a computer readable storage device configured to store a verification application and a unique system identifier that uniquely identifies the IHS; and
        a trusted platform module (TPM) configured to store a private Endorsement Key (EK), an EK certificate containing a public EK, a public signing key and a private signing key; and
    a first remote system comprising a first computer readable medium configured to store an entitlement database for the plurality of IHSs, wherein for each IHS, the entitlement database associates the unique system identifier specified for the IHS with the EK certificate and the public signing key stored within the TPM of the IHS; and
    a second remote system coupled, via a network, to the first remote system and to the plurality of IHSs, wherein the second remote system comprises a second computer readable medium configured to store verification software and a processing device, and wherein upon receiving a verification request from a first IHS to verify an identity of the first IHS, the processing device of the second remote system is configured to execute the verification software to communicate with the first remote system and the first IHS to cryptographically verify the identity of the first IHS;
    wherein upon receiving the verification request from the first IHS to verify an identity of the first IHS, the processing device of the second remote system is configured to execute the verification software to:
        receive a unique system identifier specified for the first IHS along with the verification request, and
        retrieve the EK certificate and the public signing key associated with the unique system identifier from the entitlement database stored within the first computer readable medium of the first remote system;
    wherein the processing device of the second remote system is further configured to execute the verification software to:
        generate a nonce,
        encrypt the nonce with a public EK obtained from the EK certificate; and
        transmit the encrypted nonce to the first IHS; and
    wherein the processing device of the first IHS is configured to execute the verification application to:
        send the verification request and the unique system identifier specified for the first IHS to the second remote system,
        receive the encrypted nonce from the second remote system,
        decrypt the encrypted nonce using the private EK stored within the TPM of the first IHS,
        sign the nonce and the unique system identifier using the private signing key stored within the TPM of the first IHS, and
        transmit a signed message containing the nonce and the unique system identifier to the second remote system.

2. The system as recited in claim 1, wherein the processing device of the second remote system is further configured to execute the verification software to:
    receive the signed message containing the nonce and the unique system identifier;
    verify the nonce and the unique system identifier contained within the signed message using the public signing key retrieved from the entitlement database stored within the first remote system; and
    transmit a verification response to the first IHS.

3. The system as recited in claim 2, wherein the processing device of the second remote system is configured to execute the verification software to transmit a verification response to the first IHS confirming the identity of the first IHS if:
    the nonce contained within the signed message matches the nonce generated by the second remote system; and
    the unique system identifier contained within the signed message matches the unique system identifier sent with the verification request.

4. The system as recited in claim 2, wherein the processing device of the second remote system is configured to execute the verification software to transmit a verification response to the first IHS denying the identity of the first IHS if:
    the nonce contained within the signed message does not match the nonce generated by the second remote system; or
    the unique system identifier contained within the signed message does not match the unique system identifier sent with the verification request.

5. The system as recited in claim 2, wherein the processing device of the first IHS is further configured to execute the verification application to:
    receive the verification response from the second remote system; and
    perform one or more actions based on the verification response.

6. The system as recited in claim 5, wherein if the verification response denies the identity of the first IHS, the one or more actions performed by the first IHS include alerting an administrator that the identity of the first IHS has been modified, revoking user access to the first IHS, deleting data or program code, and/or limiting functionality of the first IHS.

7. A method performed by an information handling system (IHS) to verify an identity of the IHS, the method comprising:
    generating and storing a plurality of keys within a trusted platform module (TPM) of the IHS, wherein the plurality of keys includes a public signing key and a private signing key;

sending a verification request to verify the identity of the IHS, along with a unique system identifier specified for the IHS, to a remote system; and communicating with the remote system to cryptographically verify the identity of the IHS, wherein said communicating comprises:

receiving an encrypted nonce from the remote system;

decrypting the encrypted nonce using a private Endorsement Key (EK) stored within the TPM;

signing the nonce and the unique system identifier using the private signing key stored within the TPM;

transmitting a signed message containing the nonce and the unique system identifier to the remote system; and receiving a verification response from the remote system.

8. The method as recited in claim 7, wherein said receiving a verification response comprises receiving a verification response from the remote system confirming the identity of the IHS if:

the nonce contained within the signed message matches the nonce received from the remote system; and the unique system identifier contained within the signed message matches the unique system identifier sent along with the verification request.

9. The method as recited in claim 7, wherein said receiving a verification response comprises receiving a verification response from the remote system denying the identity of the IHS if:

the nonce contained within the signed message does not match the nonce received from the remote system; or the unique system identifier contained within the signed message does not match the unique system identifier sent along with the verification request.

10. The method as recited in claim 7, further comprising performing one or more actions based upon the verification request received from the remote system.

11. The method as recited in claim 10, wherein if the verification response denies the identity of the IHS, said performing one or more actions includes alerting an administrator that the identity of the IHS has been modified, revoking user access to the IHS, deleting data or program code, and/or limiting functionality of the IHS.

12. A method performed by a remote system to verify an identity of an information handling system (IHS), the method comprising:

receiving a verification request to verify the identity of the IHS, along with a unique system identifier specified for the IHS;

using the unique system identifier to retrieve an Endorsement Key (EK) certificate and a public signing key associated with the unique system identifier from an entitlement database stored within another remote system; and communicating with the IHS over a network to cryptographically verify the identity of the IHS, wherein said communicating comprises:

generating a nonce;

encrypting the nonce with a public EK obtained from the EK certificate; and transmitting the encrypted nonce to the IHS;

wherein said communicating further comprises:

receiving a signed message containing the nonce and the unique system identifier, wherein the signed message is generated by a trusted platform module (TPM) of the IHS using a private signing key stored within the TPM, using the public signing key retrieved from the entitlement database to verify the nonce and the unique system identifier contained within the signed message, and transmitting a verification response to the IHS.

13. The method as recited in claim 12, wherein said transmitting a verification response comprises transmitting a verification response confirming the identity of the IHS if:

the nonce contained within the signed message matches the generated nonce; and the unique system identifier contained within the signed message matches the unique system identifier received along with the verification request.

14. The method as recited in claim 12, wherein said transmitting a verification response comprises transmitting a verification response denying the identity of the IHS if:

the nonce contained within the signed message does not match the generated nonce; or the unique system identifier contained within the signed message does not match the unique system identifier received along with the verification request.

* * * * *